(12) United States Patent
Arbak

(10) Patent No.: US 10,859,124 B2
(45) Date of Patent: Dec. 8, 2020

(54) SYNCHRONIZER RING FOR A SYNCHRONIZATION UNIT OF A MANUAL TRANSMISSION AND METHOD FOR THE PRODUCTION THEREOF

(71) Applicant: DIEHL METALL STIFTUNG & CO. KG, Roethenbach (DE)

(72) Inventor: Murat Arbak, Lauf an der Pegnitz (DE)

(73) Assignee: Diehl Metall Stiftung & Co. KG, Roethenbach (DE)

( * ) Notice: Subject to any disclaimer, the term of this patent is extended or adjusted under 35 U.S.C. 154(b) by 50 days.

(21) Appl. No.: 16/051,951

(22) Filed: Aug. 1, 2018

(65) Prior Publication Data
US 2019/0055995 A1 Feb. 21, 2019

(30) Foreign Application Priority Data
Aug. 19, 2017 (DE) .......... 10 2017 007 891

(51) Int. Cl.
*F16D 23/02* (2006.01)
*F16D 23/06* (2006.01)

(52) U.S. Cl.
CPC .......... *F16D 23/025* (2013.01); *F16D 23/06* (2013.01)

(58) Field of Classification Search
CPC .......... F16D 23/025; F16D 23/06; B21K 1/30
See application file for complete search history.

(56) References Cited

U.S. PATENT DOCUMENTS

| | | | | |
|---|---|---|---|---|
| 2008/0277234 | A1* | 11/2008 | Holderied | F16D 69/023 192/107 M |
| 2015/0354638 | A1* | 12/2015 | Negele | B21J 5/12 192/107 R |
| 2018/0128324 | A1* | 5/2018 | Weiher | F16D 23/025 |

FOREIGN PATENT DOCUMENTS

| | | | |
|---|---|---|---|
| DE | 102011015836 A1 | 10/2012 | |
| DE | 102011114055 A1 * | 3/2013 | ........... F16D 23/025 |
| DE | 102014106830 A1 | 11/2015 | |
| DE | 102015103405 A1 | 9/2016 | |

* cited by examiner

*Primary Examiner* — Stacey A Fluhart
(74) *Attorney, Agent, or Firm* — Laurence A. Greenberg; Werner H. Stemer; Ralph E. Locher

(57) ABSTRACT

A synchronizer ring for a synchronization unit of a manual transmission is produced from a sheet metal material and has a conical friction surface on the inner side thereof and has a device for radial centering of the synchronizer ring on the outer side thereof. The device for radial centering includes a plurality of separate arc-shaped centering collar portions spaced apart from one another in the circumferential direction.

8 Claims, 5 Drawing Sheets

SYNCHRONIZER RING FOR A SYNCHRONIZATION UNIT OF A MANUAL TRANSMISSION AND METHOD FOR THE PRODUCTION THEREOF

CROSS-REFERENCE TO RELATED APPLICATION

This application claims the priority, under 35 U.S.C. § 119, of German application DE 10 2017 007 891.2, filed Aug. 19, 2017; the prior application is herewith incorporated by reference in its entirety.

BACKGROUND OF THE INVENTION

Field of the Invention

The invention relates to a synchronizer ring for a synchronization unit of a manual transmission, which is produced from a sheet metal material and has a conical friction surface on the inner side thereof and has means for radial centering the synchronizer ring on the outer side thereof.

Synchronizer rings are component parts of manual transmissions and are used to bring a sliding collar and a gearwheel of a selected gear to the same speed. Through the production of friction, the speeds of rotation are adjusted until both components are rotating synchronously. In this state, the sliding collar can be moved axially, thereby engaging the gear.

A synchronizer ring must be centered radially within a hub. Centering is accomplished by a clearance fit, wherein the inside diameter of the hub and the outside diameter (=centering diameter) of the synchronizer ring are configured with corresponding tolerances. For this purpose, conventional synchronizer rings have a means for radial centering, which can be configured as a shaped element, on the outside diameter. The shaped element can be configured, for example, as a solid cam produced by a forging process. As an alternative, the shaped element can be configured as a tab which is produced by stamping or bending a sheet metal material.

During the production of a synchronizer ring from a sheet metal material such as steel sheet, there is the problem that it is generally not possible to produce the additional volume of material required for the means for radial centering from the relatively thin sheet metal material by massive forming.

In the case of conventional synchronizer rings produced from steel, the means for radial centering is generally produced by punching and then bending a tab. The restricted installation space at this point leads to the possibility that bent tabs will have both cracks on the outer side and creases on the inner side. However, these unwanted effects reduce the strength of the tab under dynamic load conditions. In order to avoid this problem, there has already been a proposal to connect the tab to the sheet metal ring by laser welding. However, laser welding increases production costs.

Published, non-prosecuted German patent application DE 10 2015 103 405 A discloses a synchronizer ring which, according to one illustrative embodiment, contains, on the outer side thereof, a plurality of centering collar portions which are arranged at different axial positions and are relatively short. As an alternative, another illustrative embodiment shows undulating centering collar portions which extend along the entire circumference.

SUMMARY OF THE INVENTION

It is the underlying object of the invention to specify a synchronizer ring, the means for radial centering of which can be produced at low cost and which have adequate strength, even under dynamic load conditions.

To achieve this object, there is provision according to the invention, in the case of a synchronizer ring of the type stated at the outset, for the means for radial centering to contain a plurality of separate arc-shaped centering collar portions spaced apart from one another in the circumferential direction.

In the context of the invention, it has been realized that a plurality of mutually spaced arc-shaped centering collar portions can be produced in a relatively simple manner by forming. By means of a forming tool, a material flow is brought about, producing the relatively large-area centering collar portions. In contrast to the conventional production method, in which sheet metal tabs are bent through approximately 90°, the synchronizer ring according to the invention does not have any regions critical for strength, in which cracking or creasing occurs. As a result, the required strength under dynamic load conditions is achieved.

In the context of the invention, it is preferred if the arc-shaped centering collar portions are produced from the sheet metal material by forming. By virtue of the material flow during forming, a sufficient volume of material to produce the arc-shaped centering collar portions is made available. Moreover, such massive forming processes are relatively inexpensive in comparison with other manufacturing methods, e.g. laser welding.

It is also within the scope of the invention for outer surfaces of the centering collar portions to lie on a cylindrical surface, the diameter of which corresponds to the centering diameter. The outer surfaces of the plurality of centering collar portions are component parts of a cylindrical surface. This cylindrical surface defines the centering diameter which serves for radial centering of the synchronizer ring in a hub in the installed condition. The outer surfaces of the centering collar portions are single-curvature surfaces.

A preferred development of the synchronizer ring according to the invention envisages that an arc-shaped centering collar portion is symmetrical with respect to a plane extending through the longitudinal axis of the cylinder. An arc-shaped centering collar portion can be divided notionally into two symmetrical halves. The plane of symmetry is a plane which intersects the longitudinal axis of the cylinder.

According to one embodiment of the synchronizer ring according to the invention, provision can be made for an arc-shaped centering collar portion to extend from a radial collar having blocking teeth in the direction of the axially opposite end and, from there, back in the direction of the collar having the blocking teeth. It is possible for the arc-shaped centering collar portion to have the shape of a circular segment. However, it can also be composed of a plurality of sections which do not necessarily form a circular segment. For example, an arc-shaped centering portion can be formed by two sections extending obliquely to the axial direction and a central section extending approximately transversely to the axial direction. Moreover, further modifications are possible. It is not absolutely necessary that the arc-shaped centering collar portion should have a continuous profile. Instead, it can also be formed from a plurality of sections, e.g. two, three or four arc-shaped sections, which merge into one another.

In the context of the invention, it is preferred if the synchronizer ring has three to six centering collar portions distributed over the circumference. The centering collar portions are preferably arranged at equal distances from one another.

In addition, the invention relates to a method for producing a synchronizer ring for a synchronization unit of a manual transmission, which is produced from a sheet metal material by producing a conical friction surface on the inner side thereof and means for radial centering of the synchronizer ring on the outer side thereof.

The method according to the invention is distinguished by the fact that a plurality of separate arc-shaped centering collar portions spaced apart from one another in the circumferential direction is produced as the means for radial centering.

According to a development of the method according to the invention, a material flow on the outer side of the sheet metal material formed into a ring is brought about in the axial and radial directions by means of a stamping punch in order to produce the arc-shaped centering collar portions.

Other features which are considered as characteristic for the invention are set forth in the appended claims.

Although the invention is illustrated and described herein as embodied in a synchronizer ring for a synchronization unit of a manual transmission and method for the production thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
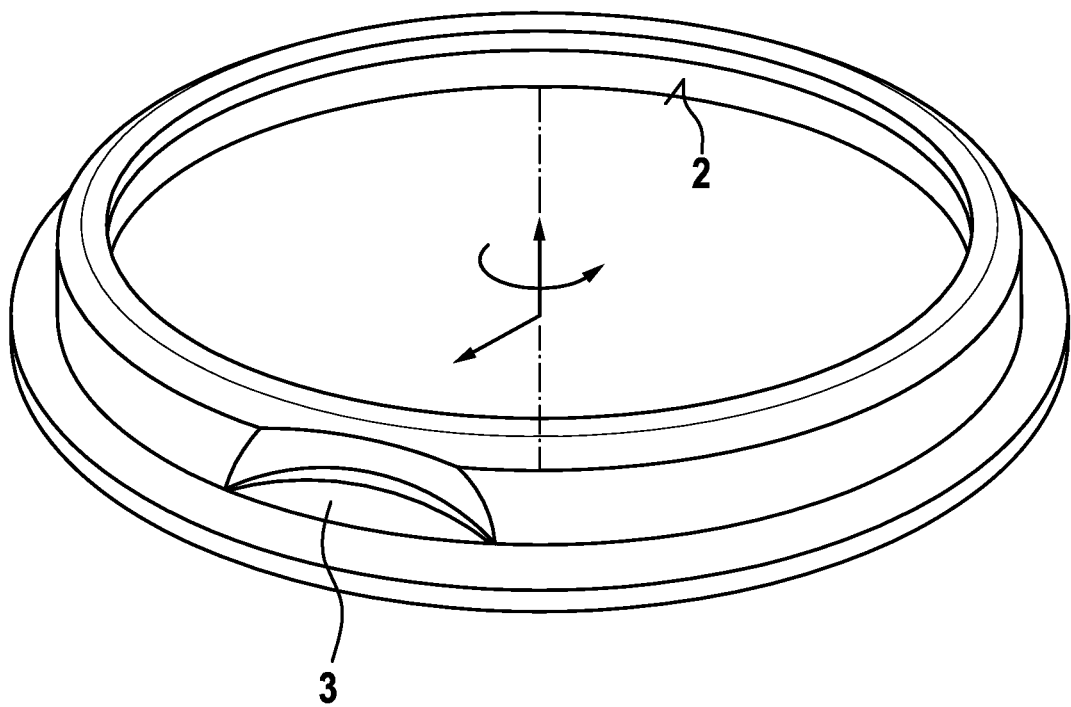
FIG. 1 is a diagrammatic, perspective view of a first illustrative embodiment of a synchronizer ring according to the invention.
Figure 2:
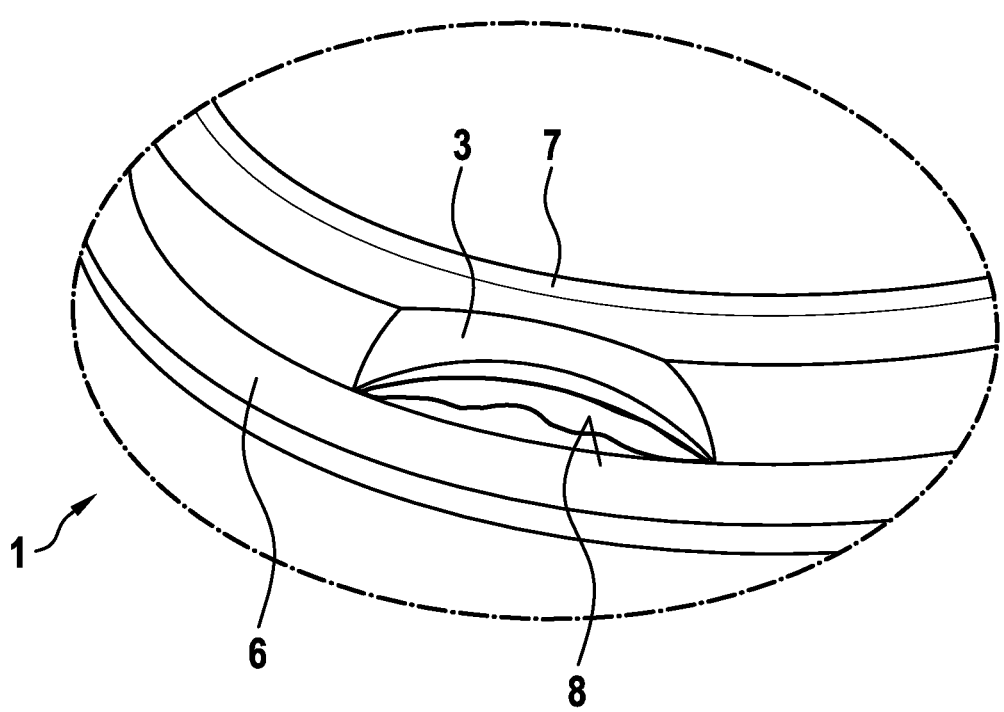
FIG. 2 is an enlarged, perspective view of a detail of the synchronizer ring shown in FIG. 1.

Referring now to the figures of the drawings in detail and first, particularly to FIG. 1 thereof, there is shown a perspective view of a synchronizer ring 1 for a synchronization unit of a manual transmission. FIG. 2 shows a detail of the synchronizer ring 1 in an enlarged view. The synchronizer ring 1 is produced from a sheet metal material. For the sake of simplicity, certain functional elements are not illustrated in FIG. 1. These are blocking teeth, which extend radially outwards, and indexing or centering tabs, which extend in the axial direction on the outer side of the synchronizer ring 1, and coupling tabs or coupling elements, which extend radially inwards.

The synchronizer ring 1 has a conical friction surface 2 on the inner side thereof. Means for radial centering are provided on the outer side thereof. In this illustrative embodiment, the means contain a plurality of separate arc-shaped centering collar portions 3 spaced apart from one another in the circumferential direction. Just one single centering collar portion 3 is illustrated in FIG. 1.

Figure 3:
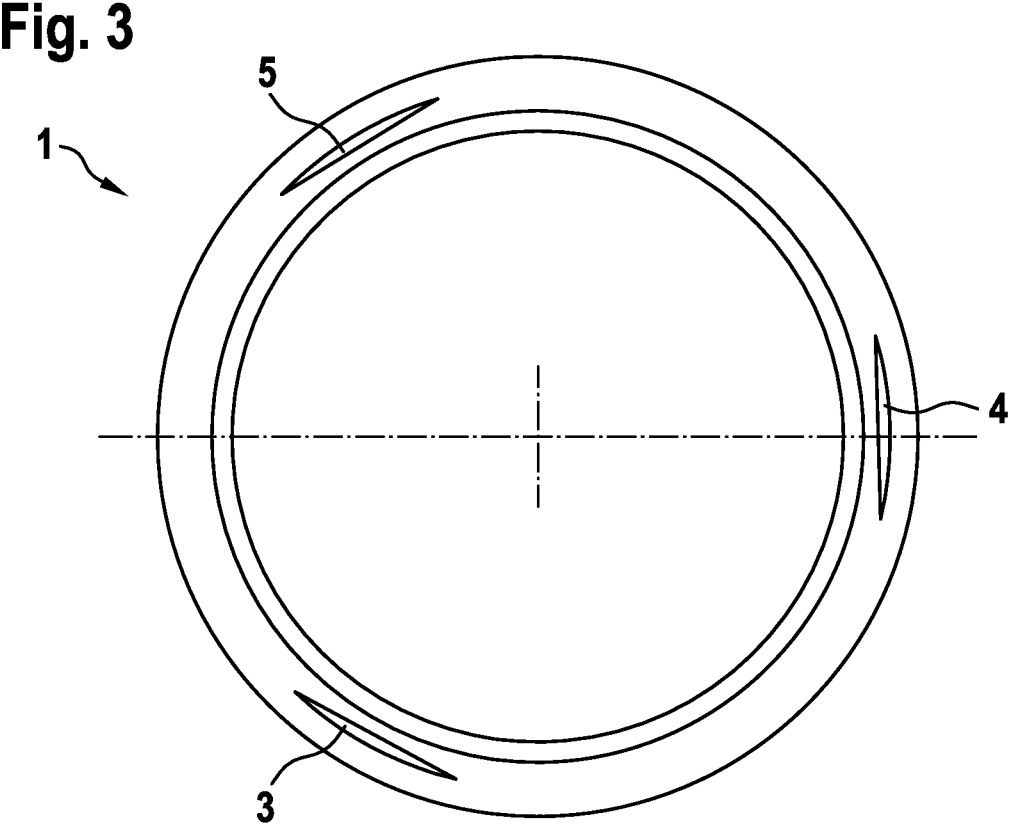
FIG. 3 is a plan view of the synchronizer ring shown in FIG. 1.

FIG. 3 is a plan view of the synchronizer ring 1, in which it can be seen that the ring has a total of three arc-shaped centering collar portions 3, 4, 5 spaced apart in the circumferential direction (tangential direction). The centering collar portions 3, 4, 5 are distributed at equal distances in the circumferential direction.

The synchronizer ring 1 is produced from a sheet metal material. First of all, a ring is produced, which is formed by a stamping punch, which is moved in the axial direction. A material flow in the direction of the blocking teeth is thereby produced. The material flow takes place both in the axial direction and in the radial direction. The undulating shape of the centering collar portions 3, 4, 5 which is illustrated in the enlarged view in FIG. 2 can be achieved in this way with relatively few forming stages. Tests have shown that the centering collar portions 3, 4, 5 have the required strength, even under dynamic loads.

It can be seen in FIG. 2 that the arc-shaped centering collar portion 3 extends from a collar 6, which extends radially outwards and which has the blocking teeth (not shown), in the direction of the axially opposite end 7 of the synchronizer ring 1. From there, the centering collar portion 3 extends back in the direction of the collar 6. It can be seen from FIG. 2 that the centering collar portion 3 is symmetrical with respect to a plane which extends through the longitudinal axis of an (imaginary) cylinder, wherein the centering collar portions lie on the cylindrical surface.

FIG. 2 illustrates the resulting centering surface 8, which extends axially and tangentially. The centering surface is a component part of the abovementioned cylindrical surface. The radial centering of the synchronizer ring 1 is brought about by this centering surface 8. The centering surface 8 is curved in the tangential direction. In this illustrative embodiment, it has an irregular circumferential line. In contrast to a conventional centering tab produced by bending, the centering surface 8 has a larger area, and therefore contact forces are distributed in the axial direction and in the tangential direction. The large centering surface 8 with material attachment over a large cross section prevents premature failure of the material, especially under dynamic loading.

Figure 4:
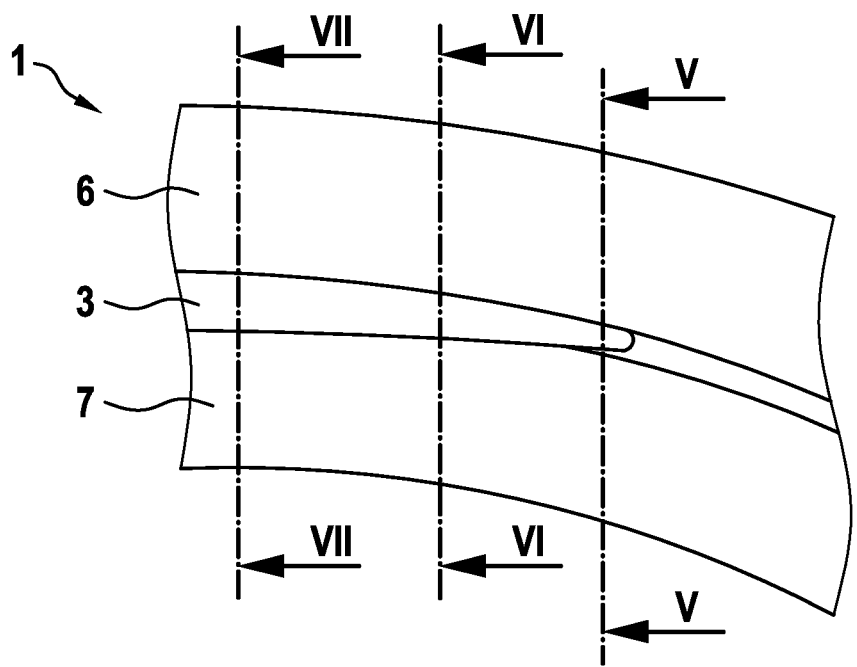
FIG. 4 is a plan view of a detail of the synchronizer ring shown in FIG. 1 in the region of a centering collar portion.

FIG. 4 is a plan view of the synchronizer ring 1 in the region of the centering collar portion 3. FIG. 4 illustrates the axial end 7 of the synchronizer ring 1, the centering collar portion 3 and the collar 6.

Figure 5:
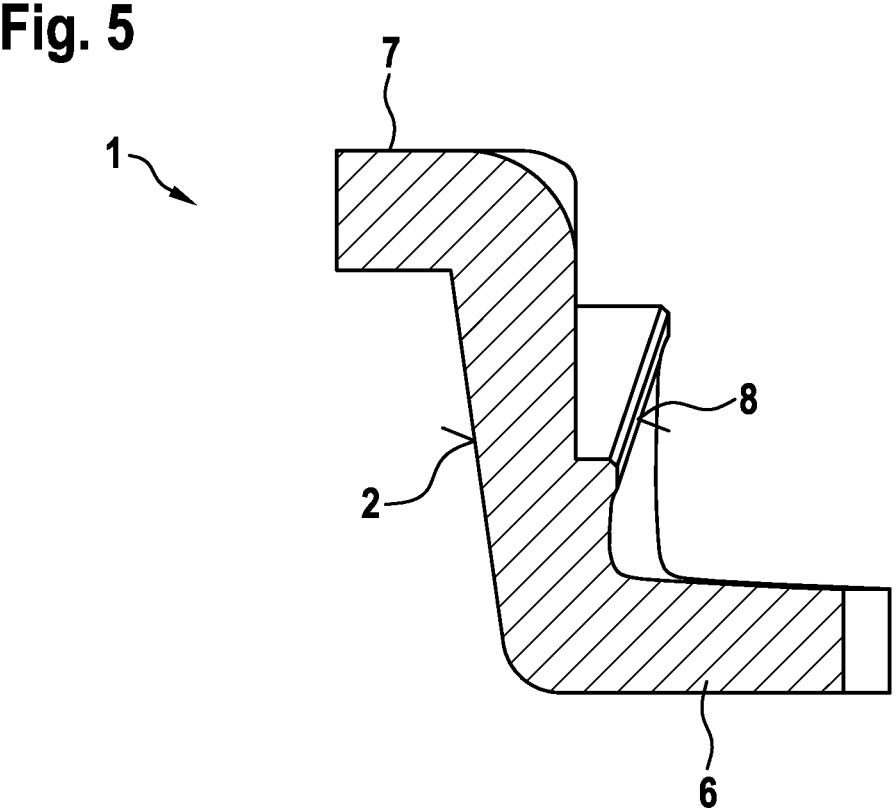
FIG. 5 is a sectional view taken along the line V-V shown in FIG. 4.

FIG. 5 is a sectioned view and shows a section along the line V-V in FIG. 4. It can be seen in FIG. 5 that the centering surface 8 has been produced by the forming process. The position of the centering surface 8 rises in the direction of view.

Figure 6:
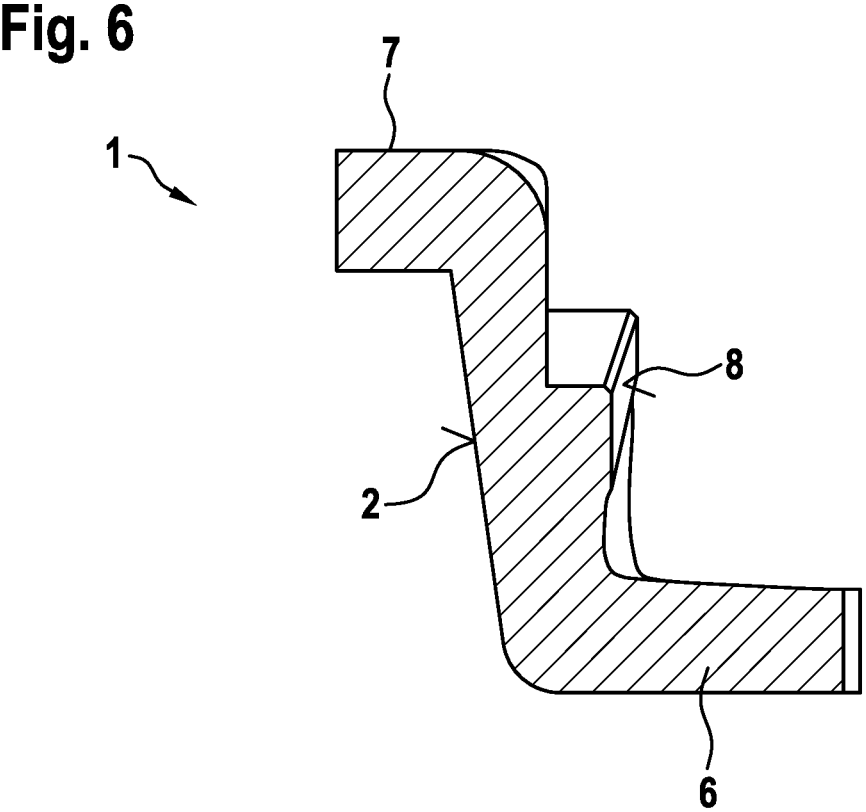
FIG. 6 is a sectional view taken along the line VI-VI shown in FIG. 4.

FIG. 6 is a sectioned view similar to FIG. 5 and shows a section along the line VI-VI in FIG. 4. In comparison with FIG. 5, it can be seen that the centering surface 8 is wider in the axial direction.

Figure 7:
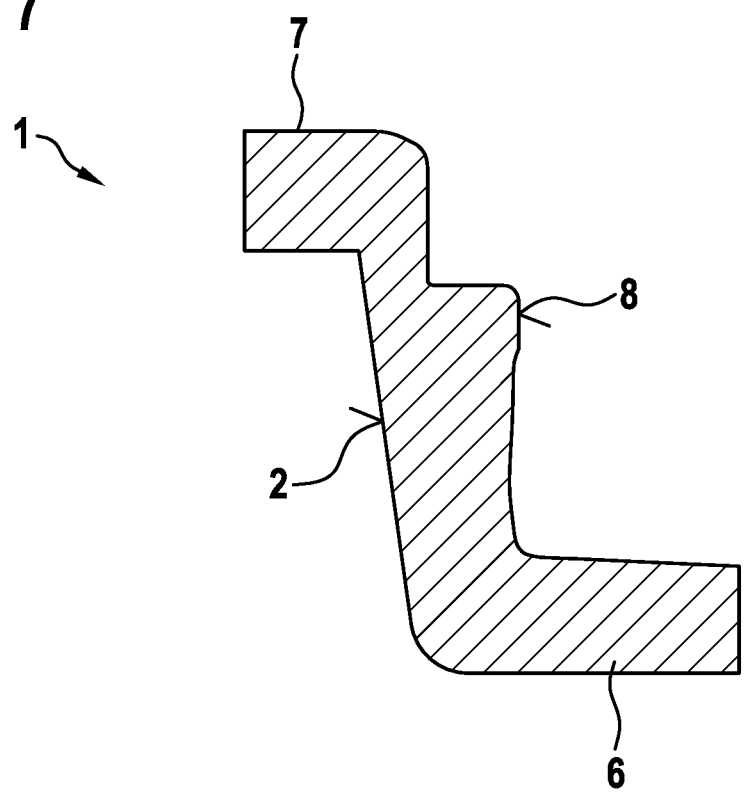
FIG. 7 is a sectional view taken along the line VII-VII shown in FIG. 4.

FIG. 7 is a similar illustration and shows a sectioned view along the line VII-VII in FIG. 4. At this position, the centering surface 8 is narrower in comparison with FIG. 6.

The shape and size of the centering surface 8 can be influenced through the choice of a suitable pressing tool.

Figure 8:
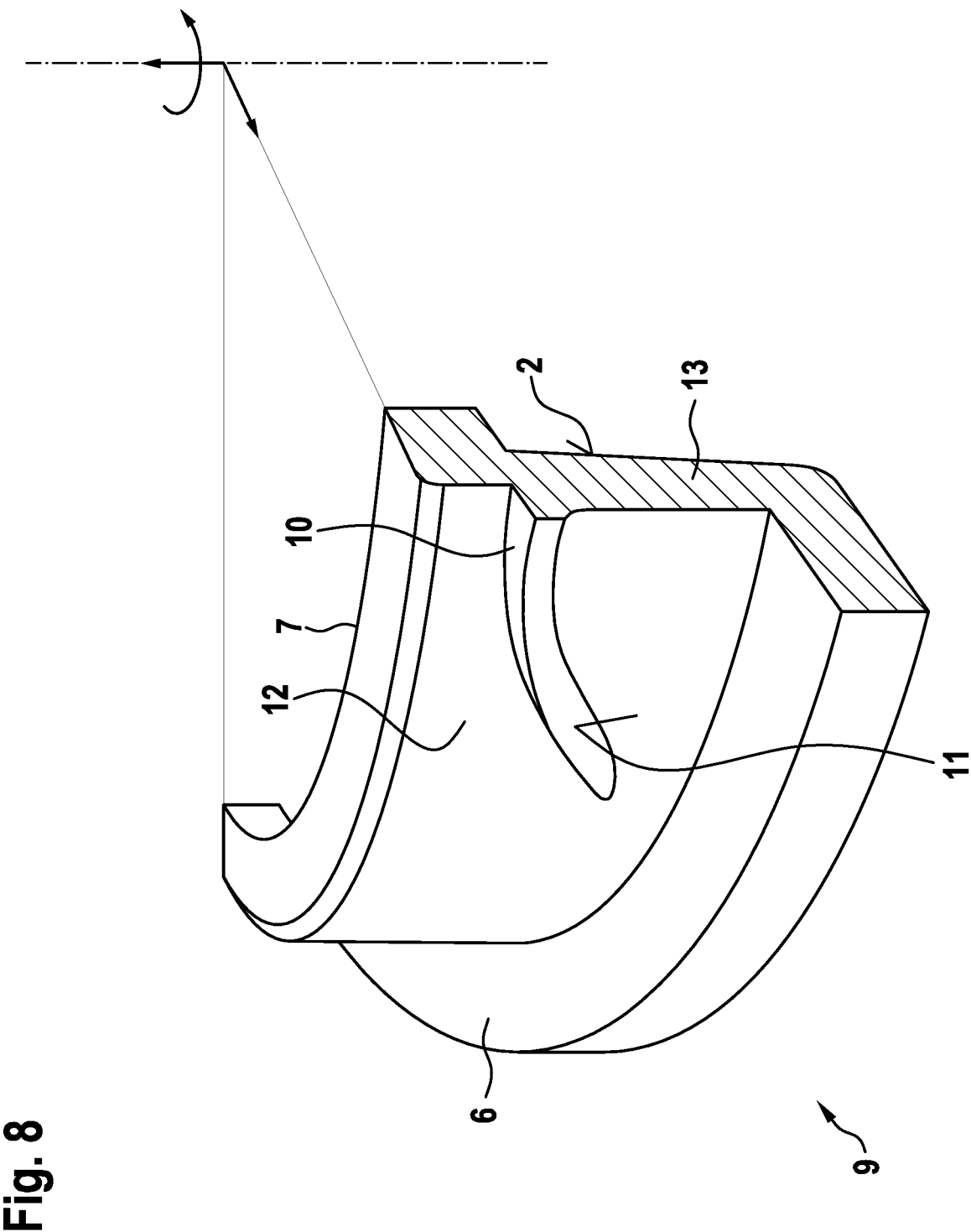
FIG. 8 is a perspective and sectional view of a detail of the synchronizer ring according to the invention according to a second illustrative embodiment.

FIG. 8 is a sectioned view of a detail of a second illustrative embodiment of a synchronizer ring. A synchronizer ring 9 has fundamentally the same structure as synchronizer ring 1. For the sake of simplicity, conventional component parts, such as the blocking teeth and coupling and indexing tabs, are not illustrated in the case of synchronizer ring 9 either.

Like the first illustrative embodiment, synchronizer ring 9 has the radially extending collar 6, a conical friction surface 2 formed on the inner side thereof, and an axial end 7. A centering collar portion 10 having a centering surface 11 is produced by forming. In FIG. 8, it can be seen that the centering collar portion 10 has been produced by a material flow on the outer side 12 of the synchronizer ring 9.

Starting from the collar 6, the arc-shaped centering surface 11 extends axially and in a tangentially oblique way in the direction of the axial end 7 of synchronizer ring 9. From a certain point, the slope decreases, and the centering collar portion 10 extends predominantly in a tangential direction. The section plane 13 shown in FIG. 8 is simultaneously the plane of symmetry of the centering collar portion 10 and of the centering surface 11. Thus, one half of the centering collar portion 10 is illustrated in FIG. 8.

The synchronizer rings described in the illustrative embodiments have the advantage that the centering collar portions can be produced in a relatively simple manner with a small number of forming steps. The synchronizer rings have a sufficient strength under dynamic load in the region of the centering collar portions thereof. In comparison with conventional centering devices, the centering collar portions are widened both in the axial direction and in the radial direction. The centering collar portions described have no effect on other functional elements. In particular, the centering collar portions do not lead to a reduction of blocking teeth.

The following is a summary list of reference numerals and the corresponding structure used in the above description of the invention:

1 synchronizer ring
2 friction surface
3 centering collar portion
4 centering collar portion
5 centering collar portion
6 collar
7 axial end
8 centering surface
9 synchronizer ring
10 centering collar portion
11 centering surface
12 outer side
13 section plane

The invention claimed is:

1. A synchronizer ring for a synchronization unit of a manual transmission, the synchronizer ring comprising:
   sheet metal material having an inner side with a conical friction surface and an outer side, said sheet metal material having a radial collar; and
   means for radial centering of the synchronizer ring disposed on said outer side of said sheet metal material, said means for radial centering having a plurality of separate arc-shaped centering collar portions spaced apart from one another in a circumferential direction of said sheet metal material, said arc-shaped centering collar portions extending from said radial collar in a direction of an axially opposite end and, from there, back in a direction of said radial collar.

2. The synchronizer ring according to claim 1, wherein said arc-shaped centering collar portions are produced from said sheet metal material by forming.

3. The synchronizer ring according to claim 1, wherein said arc-shaped centering collar portions have outer surfaces lying on said outer side of said sheet metal material and said outer side being a cylindrical surface, a diameter of which corresponds to a centering diameter.

4. The synchronizer ring according to claim 3, wherein said arc-shaped centering collar portions are symmetrical with respect to a plane extending through a longitudinal axis of said sheet metal material.

5. The synchronizer ring according to claim 1, wherein said arc-shaped centering collar portions include three to six said arc-shaped centering collar portions distributed over a circumference of said sheet metal material.

6. A method for producing a synchronizer ring for a synchronization unit of a manual transmission, which comprises the steps of:
   providing a sheet metal material having an inner side with a conical friction surface and an outer side with means for radial centering of the synchronizer ring, the sheet metal material further having a radial collar; and
   producing a plurality of separate arc-shaped centering collar portions spaced apart from one another in a circumferential direction as the means for radial centering, the arc-shaped centering collar portions extending from the radial collar in a direction of an axially opposite end and, from there, back in a direction of the radial collar.

7. The method according to claim 6, which further comprises forming a material flow on the outer side of the sheet metal material into a ring and this is brought about in axial and radial directions by means of a forming tool in order to produce the arc-shaped centering collar portions.

8. The method according to claim 7, which further comprises providing a stamping punch as the forming tool.

* * * * *